United States Patent [19]

Otsuki et al.

[11] Patent Number: 4,642,325

[45] Date of Patent: Feb. 10, 1987

[54] CATHODE-DEPOSITING ELECTRODEPOSITION COATING COMPOSITION

[75] Inventors: Yutaka Otsuki; Hiroyoshi Omika; Akio Oshima, all of Yokohama; Yoshihiko Araki, Tokyo; Yasuyuki Tsuchiya, Hirakata, all of Japan

[73] Assignee: Nippon Oil Company, Ltd., Osaka, Japan

[21] Appl. No.: 720,602

[22] Filed: Apr. 5, 1985

[30] Foreign Application Priority Data

Apr. 14, 1984 [JP] Japan .................................. 59-73879
Dec. 10, 1984 [JP] Japan ................................ 59-259312

[51] Int. Cl.$^4$ ............................................ C08L 63/10
[52] U.S. Cl. ........................................ 525/65; 525/71; 525/74
[58] Field of Search ............................ 525/74, 65, 71

[56] References Cited

U.S. PATENT DOCUMENTS 4,563,501  1/1986  Otsuki et al. .......................... 525/65

FOREIGN PATENT DOCUMENTS 48-75684 10/1972 Japan ..................................... 525/71
48-75696 10/1973 Japan ..................................... 525/71

*Primary Examiner*—Allan M. Lieberman
*Assistant Examiner*—Robert E. L. Sellers, II
*Attorney, Agent, or Firm*—Wenderoth, Lind & Ponack

[57] ABSTRACT

A cathode-depositing electrodeposition coating composition having excellent low-temperature curability comprising as essential ingredients (A) 100 parts by weight of a reaction product of (1) a high molecular compound having a molecular weight of 500 to 5,000 and containing carbon-carbon double bonds with an iodine number of 50 to 500 and 3 to 12% by weight of oxirane oxygen, and (2) 30 to 300 millimoles, per 100 g of the high molecular compound (1), of a specified amine compound, (B) 10 to 200 parts by weight of a reaction product of a specified diglycidyl compound with 1.9 to 2.1 moles, per molecule of the diglycidyl compound, of an alpha, beta-unsaturated carboxylic acid or an unsaturated fatty acid having a molecular weight of 100 to 350 and containing at least 10% by weight of a carbon-carbon double bond, or a mixture of both, (C) 0.5 to 10 parts by weight of a reaction product of a high molecular compound having a molecular weight of 500 to 5,000 and containing a carbon-carbon double bond with an iodine number of 50 to 500 and 40 to 400 millimoles, per 100 g of the high molecular compound, of a specified alpha, beta-unsaturated dicarboxylic acid and (D) 0.005 to 1.0 part by weight, as metal, of a water-soluble salt of an organic acid with a metal selected from manganese, cobalt, and copper.

5 Claims, No Drawings

CATHODE-DEPOSITING ELECTRODEPOSITION COATING COMPOSITION

This invention relates to a cathode-depositing electrodeposition coating composition having excellent low temperature curability.

A resin having a certain basic group produces a cation in water, and in an electrodepositin process, deposits on the cathode. Conventional anode-depositing electrodeposition paints obtained by neutralizing resins having acidic groups with bases to make them water-soluble have the essential defect that a metal to be coated dissolves in coating baths containing the paints. Cathode-depositing paints of the aforesaid type, however, are free from this defect and can solve various problems attributed to it.

The present inventors studied such cathode-depositing paints, and found that resins for cathode-depositing electrodepositon paints capable of giving excellent film properties can be obtained by introducing an amino group into a synthetic polymer of a low degree of polymerization having a carbon-carbon double bond, for example a high molecular compound having an unsaturated group such as liquid polybutadiene, and neutralizing the polymer with an acid. The technique was applied for a patent (Japanese Laid-Open Patent Publications Nos. 119727/1976, 147638/1977 and 16048/1978).

A cathode-depositing electrodeposition coating composition containing the aforesaid resin as a film-forming component cures mainly by the oxidative polymerization of the unsaturated group of the resin and gives coated films having excellent properties. To cure it within a practical period of time, however, relatively high baking temperatures are required. The present inventors made investigations in order to lower the baking temperature, and found that by adding a metal dryer such as a water-soluble manganese salt, the coated film can be cured at relatively low baking temperatures (Japanese Laid-Open Patent Publication No. 142444/1978). The dryer, however, is required in a large amount in this method, and electrodepositing properties such as throwing power are degraded. Other problems such as the roughening tendency of the coated surface also arise.

The present inventors also found a method of curing at relatively low baking temperatures by introducing a highly reactive (acrylic or methacrylic) double bond into the resin, and applied it for a patent (Japanese Laid-Open Patent Publication No. 151777/1981). By adding a water-soluble manganese salt in this case, there can be obtained a cathode-depositing electrode-position paint having excellent properties and capable of being cured at a relatively low temperature of 160° C.

In recent years, however, still lower baking temperatures have been desired in order to save energy With the foregoing background in mind, the present inventors have made extensive investigations, and found that the baking temperarures can be further lowered by adding an alpha,beta-unsaturated dicarboxylic acid adduct of a high molecular compound having carbon-carbon double bonds or its derivatives such as its partial ester or amide, or an unsaturated monocarboxylic acid or its dimer, and a metal selected from manganese, cobalt and copper to a resin having highly reactive acrylic (methacrylic) double bonds or carbon-carbon conjugated double bonds.

It is an object of this invention therefore to improve the curability of the aforesaid resin and provide a cathode-depositing electrodepositing paint having low-temperature curability and excellent corrosion resistance.

According to this invention, there is provided a cathode-depositing electrodeposition coating composition having excellent low-temperature curability comprising as essential ingredients (A) 100 parts by weight of a reaction product of (1) a high molecular compound having a molecular weight of 500 to 5,000 based upon the number average molecular weight, and containing carbon-carbon double bonds with an iodine number of 50 to 500 and 3 to 12% by weight of oxirane oxygen, (2) 30 to 300 millimoles, per 100 g of the high molecular compound (1), of an amine compound represented by the general formula

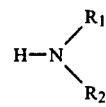

wherein each of $R_1$ and $R_2$ represents a hydrocarbon group having 1 to 20 carbon atoms a part of which may be substituted by a hydroxyl group, and $R_1$ and $R_2$ may assume a ring structure which may contain an unsaturated group, and (3) 0 to 200 millimololes, per 100 g of the high molecular compound (1), of an alpha,beta-unsaturated carboxylic acid represented by the general formula

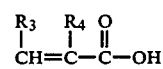

wherein $R_3$ and $R_4$ represent a hydrogen atom or a methyl group, or an unsaturated fatty acid having a molecular weight of 100 to 350 based upon the number average molecular weight and containing at least 10% by weight of a carbon-carbon conjugated double bond or a mixture of both, (B) 10 to 200 parts by weight of a reaction product of a diglycidyl compound represented by the general formula

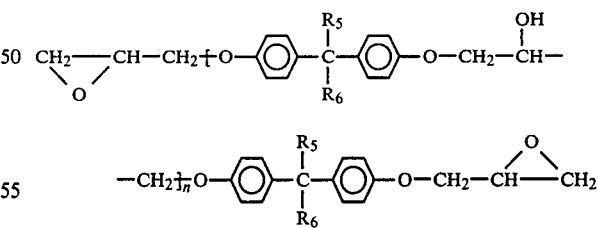

wherein $R_5$ and $R_6$ represent a hydrogen atom or a methyl group, and n represents an integer of 0 to 20, preferably 1 to 10, with 1.9 to 2.1 moles, per molecule of the diglycidyl compound, of an alpha,beta-unsaturated carboxylic acid represented by the general formula

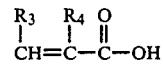

wherein $R_3$ and $R_4$ represent a hydrogen atom or a methyl group, or an unsaturated fatty acid having a molecular weight of 100 to 350 and containing at least 10% by weight of a carbon-carbon double bond, or a mixture of both, (C) (1) 0.5 to 10 parts by weight of a reaction product of a high molecular compound having a molecular weight of 500 to 5,000 based upon the number average molecular weight and containing a carbon-carbon double bond with an iodine number of 50 to 500 and 40 to 400 millimoles, per 100 g of the high molecular compound, of an alpha,beta-unsaturated dicarboxylic acid represented by the general formula

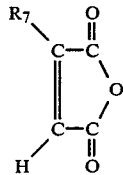

wherein $R_7$ represents a hydrogen or halogen atom or a methyl group, or a derivative of the reaction product such as its partial ester or partial amide, or (2) 0.1 to 10 parts by weight of an unsaturated monocarboxylic acid having 6 to 24 carbon atoms or its dimer, and (D) 0.005 to 1.0 part by weight, as metal, of a water-soluble salt of an organic acid with a metal selected from manganese, cobalt, and copper.

A high molecular compound having a molecular weight of 500 to 5,000 based upon the number average molecular weight and containing carbon-carbon double bonds with an iodine number of 50 to 500, which is a starting material for component (A), can be produced by known methods.

A typical method comprises anionic polymerization or copolymerization of a conjugated diolefin having 4 to 10 carbon atoms alone or such diolefins with each other or such a diolefin with not more than 50 mole %, based on the conjugated diolefin, of an aromatic vinyl monomer such as styrene, alpha-methylstyrene, vinyltoluene or divinylbenzene at a temperature of 0° to 100° C. in the presence of an alkali metal or an organoalkali metal compound as a catalyst. In order to obtain a light-colored low polymer having a low gel content by controlling its molecular weight, there are conveniently used, for example, a chain transfer polymerization method involving the use of a compound having an alkylaryl group such as toluene as a chain transfer agent (U.S. Pat. No. 3,789,090), a living polymerization method in a tetrahydrofuran solvent using a polynuclear aromatic compound such as naphthalene as an activator and an alkali metal such as sodium as a catalyst (Japanese Patent Publications Nos. 17485/1967 and 27432/1968), and a polymerization method in which an aromatic hydrocarbon such as toluene or xylene is used as a solvent, a dispersion of an alkali metal such as sodium is used as a catalyst and the molecular weight is controlled by adding an ether such as dioxane (Japanese Patent Publications Nos. 7446/1957, 1245/1963 and 10188/1959). There can also be used a low polymer produced by coordination anionic polymerization in the presence of an acetyl-acetonate compound of a metal of Group VIII such as cobalt or nickel and an alkylaluminum halide as a catalyst (Japanese Patent Publications Nos. 507/1970 and 80300/1971).

The component (A) used in the composition of this invention can be produced by epoxidizing the aforesaid unsaturated compound with a peroxide such as hydrogen peroxide or peracid in a customary manner to introduce 3 to 12% by weight, as oxygen, an oxirane oxygen group, reacting the product with an amine compound represented by the general formula

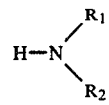

wherein $R_1$ and $R_2$ are as defined above, in the presence or absence of a solvent at a temperature of 50° to 200° C., and thereafter reacting the product at a temperature of 100° to 200° C. with an alpha,beta-unsaturated carboxylic acid represented by the general formula

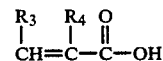

wherein $R_3$ and $R_4$ are as defined above, or an unsaturated fatty acid having a molecular weight of 100 to 350 based upon the number average molecular weight and containing at least 10% by weight of a carbon-carbon conjugated double bond, or a mixture of both.

Examples of the amine used in the reaction include aliphatic amines such as dimethylamine and diethylamine, alkanolamines such as methylethanolamine and diethanolamine, and cyclic amines such as morpholine and piperidine.

The amount of the amine to add is 30 to 300 millimoles, preferably 50 to 200 millimoles, per 100 g of the epoxidized high molecular compound. If the amount of the amine is less than 30 millimoles, the water-solubility of the coating composition is insufficient, and properties suitable for practical application cannot be obtained. If it is more than 300 millimoles, the increased viscosity of the resin owing to the addition of the amine may sometimes lead to marked gellation.

Examples of the alpha,beta unsaturated carboxylic acid are acrylic acid, methacrylic acid and crotonic acid.

The unsaturated fatty acid having a molecular weight of 100 to 350 based upon the number average molecular weight and containing at least 10% by weight of a carbon-carbon conjugated double bond may, for example, include sorbic acid, Chinese tung oil fatty acid, sunflower oil fatty acid, and dehydrated castor oil fatty acid. Conjugated fatty acids obtained by isomerizing soybean oil fatty acid, linseed oil fatty acid, etc. may also be used. Purified eleostearic acid and conjugated linoleic acid may further be used. There can also be used a mixture which consists of an unsaturated fatty acid having not more than 10% by weight of a carbon-carbon conjugated double bond with an unsaturated fatty acid having many conjugated double bonds and has at least 10% by weigh in total of conjugated double bonds. Dehydrated castor oil fatty acid is advantageous and preferred because it is easily available industrially.

Preferably, the alpha,beta-unsaturated carboxylic acid and the unsaturated fatty acid are used such that their total amount as carboxylic acid is 50 to 150 millimoles per 100 g of the epoxidized high molecular compound. If the amount of the carboxylic acid is less than 50 millimoles curing of the coated film by baking at low temperatures becomes insufficient, and properties satisfactory for practical applications cannot be obtained. If it is above 150 millimoles, the increased viscosity of the resin may sometimes lead to marked gellation.

The addition of the component (B) obtained by reacting a diglycidyl compound represented by the general formula

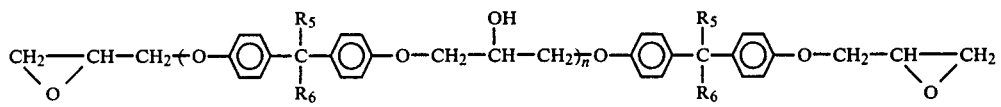

wherein $R_5$ and $R_6$ represent a hydrogen atom or a methyl group, and n represents an integer of 0 to 20, with 1.9 to 2.1 moles, per molecule of the diglycidyl compound, of an alpha-beta-unsaturated carboxylic acid represented by the general formula

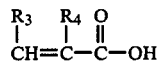

wherein $R_3$ and $R_4$ represent a hydrogen atom or a methyl group,
or an unsaturated fatty acid having a molecualr weight of 100 to 350 and containing not more than 10% by weight of a carbon-carbon conjugated double bond, or a mixture of both leads to a marked improvement in corrosion resistance.

The content of the component (B) is 10 to 200 parts by weight, preferably 30 to 100 parts by weight, per 100 parts by weight of the resin (A). If the content of the component (B) is lower than the specified limit, the improvement of corrosion resistance is not sufficient. If it is higher than the specified limit, the water dispersibility of the resulting composition is reduced.

The component (B) is prepared by using the diglycidyl compound represented by the general formula

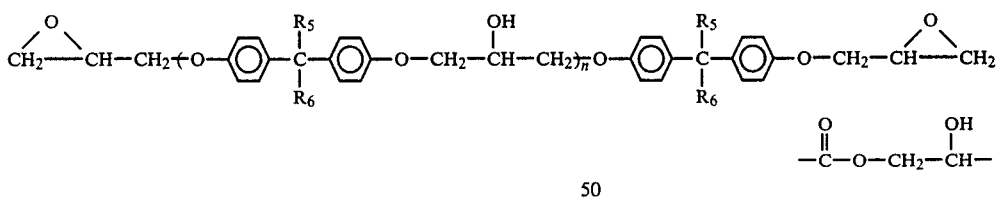

(wherein $R_5$ and $R_6$ are as defined above) as a starting material. The glycidyl compound can be prepared usually by etherifying a bisphenol with epichlorohydrin in the presence of an alkali. Examples of the bisphenol compound are 2,2-bis(4'-hydroxyphenyl)propane, 1,1-bis(4'-hydroxyphenyl)ethane, and 1,1-bis(4'-hydroxyphenyl)isobutane. In many cases, the diglycidyl ether is further reacted with a bisphenol, etc. and the product is further reacted with epichlorohydrin. As a result, a diglycidyl compound having a slightly higher molecular weight can be synthesized. This compound can be used as the starting material.

The component (B) can be produced by reacting the diglycidyl compound with substantially 2 moles (1.9–2.1 moles), per mole of the diglycidyl compound, of the above alpha,beta-unsaturated monocarboxylic acid of the general formula

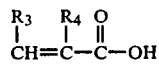

wherein $R_3$ and $R_4$ represent a hydrogen atom or a methyl group, or the unsaturated fatty acid having a molecular weight of 100 to 350 based upon the number average molecular weight and containing at least 10% by weight of a carbon-carbon conjugated double bond, or the mixture of these.

Preferably, the reaction is carried out in the presence of 0.01 to 1.0% of a radical polymerization inhibitor such as hydroquinone, methoquinone and N-phenyl-N'-isopropyl-p-phenylenediamine and a suitable catalyst such as tertiary amines or quaternary ammonium salts in order to inhibit side-reactions. The reaction may be carried out in the presence or absence of a solvent. Advantageously, the solvent is inert to the reaction and can be used in electrodeposition paints. After the reaction, it can be utilized in an electrode-position paint by mixing the reaction mixture directly with the components (A) and (C) without removing the solvent. Examples of such solvent are ethyl Cellosolve acetate and methyl isobutyl ketone.

Preferably, the epoxy groups

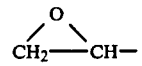

react with the carboxyl group and are converted to the groups

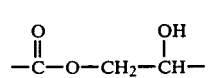

so that the epoxy groups do not substantially remain.

If the epoxy groups remain in a large amount, they undesirably react with the basic groups of the resin (A) at the time of water-solubilizing the composition with an acid, and gellation occurs. Consequently, the viscosity of the composition becomes extremely high to impair water solubilization. Even if water solubilization can be effected, the aqueous solution changes with time, and constant electrodeposition properties or electrodeposited films of constant quality cannot be obtained.

Epoxy resins of the bisphenol type have previously been known to have excellent corrosion resistance, and attempts have been made to impart curability to these resins by leaving some of the epoxy groups (Japanese Patent Publications Nos. 23807/1969 and 15860/1976) or using blocked isocyanate compounds as curing agents. However, such paints require high temperatures of, for example, more than 200° C. in order to obtain practical film hardness. Another defect is that even when curing can be carried out at relatively low temperatures, the baking temperature can be selected only from a narrow range.

Under practical electrodeposition conditions, those bisphenol-type epoxy resins which have a fairly high molecular weight should be used, and this naturally tends to result in coated films lacking suppleness.

It is indeed surprising therefore that according to this invention, the compound (B) resulting from the conversion of substantially all of the groups

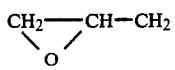

of the diglycidyl compounds into groups

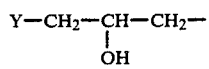

can be used as one component of a cathode-depositing electrodeposition coating composition together with the resin (A), and thereby the corrosion resistance of the resin (A) can be markedly improved without impairing its excellent curability and film-forming property at all.

By adding 0.5 to 10 parts by weight, preferably 1 to 5 parts by weight, of a reaction product of a high molecular compound having a molecular weight of 500 to 5,000 based upon the number average molecular weight and containing a carbon-carbon double bond with an iodine number of 50 to 500 and 40 to 400 millimoles, per 100 g of the high molecular compound, of an alpha,-beta-unsaturated dicarboxylic acid represented by the general formula

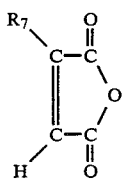

wherein $R_7$ represents a hydrogen or halogen atom or a methyl group,
or a derivative of the reaction product, or 0.1 to 10 parts by weight, preferably 1 to 5 parts by weight, per 100 parts by weight of the component (A), of an unsaturated monocarboxylic acid having 6 to 24 carbon atoms or its dimer as component (C) to the components (A), (B) and (D), the curability of the resulting composition can be promoted, and a low-temperature curable cathode-depositing electrodeposition paint can be obtained.

If the amount of the reaction product of the high molecular compound having a carbon-carbon double bond and the alpha,beta-unsaturated dicarboxylic acid or the derivative of the reaction product [component (C-1)] is less than 0.5 part by weight, or if the amount of the unsaturaed monocarboxylic acid having 6 to 24 carbon atoms or its dimer [component (C-2)] is less than 0.1 part by weight, these compounds have little effects of promoting curability. Furthermore, if the amounts of the compounds (C-1) and (C-2) are more than 10 parts by weight, good curability can be obtained but the corrosion resistance of the resulting composition is undesirably reduced.

The component (C-1) can be obtained by the addition-reaction of low-molecular-weight polybutadiene or unsaturated natural oils and fats with alpha,beta-unsaturated dicarboxylic acids at 150° to 250° C. Typical examples include maleinized polybutadiene and maleinized linseed oil. Derivatives, such as half esters or half amides, of these compounds may also be used. Examples of the alpha,beta-unsaturated dicarboxylic acids that can be used for this purpose include maleic acid, citraconic acid and chloromaleic acid.

Examples of the component (C-2) include purified unsaturated fatty acids such as tung oil fatty acid, linseed oil fatty acid, sunflower oil fatty acid, soybean oil fatty acid, dehydrated castor oil fatty acid, castor oil fatty acid, safflower oil fatty acid, tall oil fatty acid, oleic acid, linoleic acid, linolenic acid, eleostearic acid, beef tallow and fish oil fatty acid, conjugated unsaturated fatty acids obtained by isomerizing dehydrated castor oil fatty acid, sunflower oil fatty acid, etc., and unsaturated monocarboxylic acids such as sorbic acid and cinnamic acid.

Cyclic unsaturated monocarboxylic acids such as abietic acid and pimaric acid obtained from natural rosin can also be used. Examples of the dimer are dimeric acid obtained from tall oil fatty acid, etc. and dimer rosin obtained from rosin. One, or a mixture, of the aforesaid unsaturated monocarboxylic acids or the dimers thereof can be used.

If the amount of the water-soluble salt of an organic acid with a metal selected from manganese, cobalt and copper as component (D) is less than 0.005 part by weight as metal, it has a small effect of promoting curability. If it exceeds 1.0 part by weight, good curability can be obtained, but it undesirably reduces water resistance and corrosion resistance. The preferred amount of the component (D) is 0.01 to 0.5 part by weight as metal.

To dissolve or disperse the composition composed of the components (A), (B), (C) and (D) in this invention in water, it is preferred to mix the components (A), (b) and (C) in advance, neutralizing the mixture with 0.1 to 2.0 moles, preferably 0.2 to 1.0 mole, per mole of the amino groups of component (A), of a water-soluble organic acid such as formic acid, acetic acid, propionic acid and lactic acid, and dissolving it in water. Since the component (D) is water-soluble, it is dissolved in advance in water used to dissolve the mixture of the components (A), (B) and (C), or it is added later to an aqueous dispersion of the mixture of the components (A), (B) and (C).

In dissolving or dispersing the composition of this invention in water, it is preferred to use 10 to 100 parts by weight, per 100 parts by weight of the resin composition, of an organic solvent which is water-soluble and can dissolve various resin compositions, in order to facilitate dissolving or dispersing, increase the stability of the aqueous solution, and improve the flowability of the resin and the smoothness of the coated film. Examples of such an organic solvent includes ethyl Cellosolve, propyl Cellosolve, butyl Cellosolve, ethylene glycol dimethyl ether, diethylene glycol dimethyl ether, diacetone alcohol, 4-methoxy-4-methylpentanone-2, and methyl ethyl ketone.

The cathode-depositing electrodeposition coating composition of this invention may further contain one or more of pigments such as iron oxide, lead, oxide, strontium chromate, carbon black, titanium dioxide, talc, aluminum silicate and barium sulfate.

These pigments may be directly added to the composition of this invention. It is also possible to add a large amount of such a pigment to a part of an aqueous dispersion or solution of the component (A) obtained by neutralizing the component (A) and dispersing or dissolving it in water to form a paste-like master batch. This paste-like pigment master batch may be added to the composition of this invention.

The following Examples and Comparative Examples illustrate the present invention more specifically. The properties of the coated films in these examples were tested in accordance with JIS K-5400.

PRODUCTION EXAMPLE 1

Polybutadiene (Nisseki Polybutadiene B-2000, number average molecular weight 2000, 1,2-bond 65%) was epoxidized with peracetic acid to produce epoxidized polybutadiene ($E_1$) having an oxirane oxygen content of 6.4% and an iodine number of 200.

A 2-liter autoclave was charged with 1,000 g of the epoxidized polybutadiene ($E_1$) and 354 g of ethyl Cellosolve, and 62.1 g of dimethylamine was added. They were reacted at 150° C. for 5 hours. The unreacted amine was distilled off, and the residue was cooled to 120° C. Then, a mixture of 79.3 g of acrylic acid, 7.6 g of hydroquinone and 26.4 g of ethyl Cellosolve was added, and the mixture was further reacted at 120° C. for 2 hours and 45 minutes to produce a resin solution ($A_1$) of the component (A) in accordance with this invention. The resin A had an amine number of 85.2 millimoles/100 g and an acid number of 10.0 millimoles/100 g and the solution had a solids concentration of 75.0% by weight.

PRODUCTION EXAMPLE 2

Polybutadiene (Nisseki Polybutadiene B-1800; number average molecular weight 1800, 1,2-bond 64%) was epoxidized with peracetic acid to produce epoxidized polybutadiene ($E_2$) having an oxirane oxygen content of 6.5% and an iodine number of 195.

A 3-liter separable flask was charged with 1,000 g of the epoxiedized polybutadiene ($E_2$), 377 g of ethyl Cellosolve and 131.0 g of methyl ethanolamine, and they were eacted at 170° C. for 6 hours. After the reaction, the reaction mixture was cooled to 150° C. Then, a mixture of 140.0 g of dehydrated castor oil fatty acid, 8.8 g of hydroquinone and 61.1 g of ethyl Cellosolve was added, and the mixture was reacted at 150° C. for 2 hours. The reaction mixture was cooled to 120° C., and 43.2 g of acrylic acid was added. The mixture was reacted at 120° C. for 4 hours to produce a resin solution ($A_2$) of the component (A) of this invention.

The resin had an amine number of 99.90 mmoles/100 g and an acid number of 9.9 mmoles/100 g and the solution had a solids concentration of 75% by weight.

PRODUCTION EXAMPLE 3

Polybutadiene (Nisseki Polybutadiene B-1800; number average molecular weight 1800, 1,2-bond 64%) was epoxidized with hydrogen peroxide using formic acid as a catalyst to produce epoxidized polybutadiene ($E_3$) having an oxirane oxygen content of 6.7% by weight and an iodine number of 195.

A 3-liter autoclave was charged with 1,000 g of the epoxidized polybutadiene ($E_3$) and 357 g of ethyl Cellosolve, and 74.6 g of dimethylamine was added. The mixture was reacted at 150° C. for 5 hours. The unreacted amine was distilled off. Then, a mixture of synthetic drying oil fatty acid (Hidiene, a trade name, a product of Soken Chemical Co., Ltd.), 8.4 g of hydroquinone and 61.1 g of ethyl Cellosolve was added, and the mixture was reactd at 150° C. for 2 hours. The reaction mixture was cooled to 120° C., and 43.2 g of acrylic acid was added. The mixture was reacted at 120° C. for 4 hours to produce a resin solution ($A_3$) of the component (A) of this invention.

The resin had an amine value of 93.6 millimoles/100 g and an acid value of 9.8 millimoles/100 g, and the solution had a solids concentration of 75% by weight.

PRODUCTION EXAMPLE 4

One thousand grams of a bisphenol-type epoxy esin (EPIKOTE 1004, a trade name for a product of Yuka-Shell Epoxy Co., Ltd.) having an epoxy equivalent of 950 which was obtained by reacting bisphenol A and epichlorohydrin in the presence of an alkaline catalyst and had the following formula

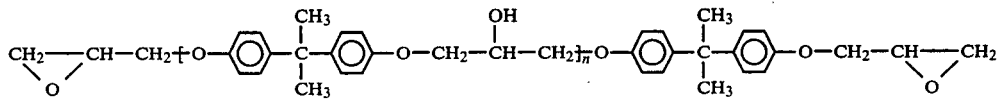

was dissolved in 343 g of ethyl Cellosolve, and 76.3 g of acrylic acid, 10 g of hydroquinone and 5 g of N,N-dimethylaminoethanol were added. The mixture was heated to 100° C. for 5 hours to produce a resin solution ($B_1$) of the component (B) of this invention.

PRODUCTION EXAMPLE 5

One thousand grams of a bisphenol-type epoxy resin (trade name EPIKOTE 1004 made by Yuka Shell Epoxy Co., Ltd.) which was obtained by reacting bisphenol A and epichlorohydrin in the presence of an alkaline catalyst and had the following structure

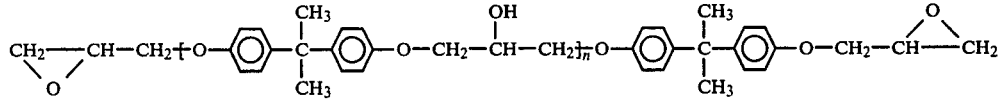

was dissolved in 395 g of ethyl Cellosolve, and 148.4 g of eleostearic acid, 38.2 g of acrylic acid, 12 g of hydroquinone and 6 g of N,N-dimethylaminoethanol were added. The mixture was heated to 100° C. and maintained for 5 hours to produce a resin solution ($B_2$) of the component (B) of this invention.

PRODUCTION EXAMPLE 6

One thousand grams of a bisphenol-type epoxy resin (EPIKOTE 1001, trade name, a product of Yuka Shell Epoxy Co., Ltd.) having an epoxy equivalent of 485 which was obtained by reacting bisphenol A and epichlorohydrin in the presence of an alkaline catalyst and had the following structure

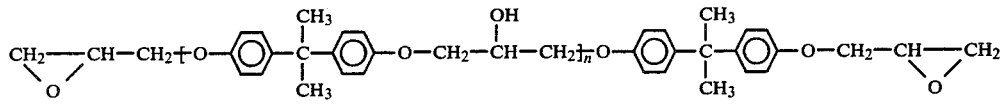

was dissolved in 400 g of ethyl Cellosolve acetate, and 145.6 g of dehydrated castor oil fatty acid, 111.6 g of acrylic acid, 10 g of hydroquinone and 5 g of N,N-dimethylaminoethanol were added. The mixture was heated to 100° C. for 5 hours to synthesize a resin solution (B$_3$) of the component (B) of this invention.

PRODUCTION EXAMPLE 7

A 2-liter separable flask equipped with a reflux condenser was charged with 1,000 g of polybutadiene (Nisseki Polybutadiene B-1000; number average molecular weight 1000, 1,2-bond 60%, iodine number 440), 265.8 g of maleic anhydride, 10 g of xylene and 1 g of Antigen 6C (a trade name for a product of Sumitomo Chemical Co., Ltd.), and they were reacted at 190° C. for 5 hours in a stream of nitrogen. Then, the unreacted maleic anhydride and xylene were distilled off under reduced pressure to synthesize maleinized polybutadiene (M$_1$) having an acid number of 214 millimoles/100 g.

The maleinized polybutadiene (M$_1$) (1,000 g) and 212.4 g of ethyl Cellosolve were charged into a 2-liter separable flask equipped with a reflux condenser, and reacted at 120° C. for 2 hours to produce a half ester (C$_1$) of maleinized polybutadiene.

PRODUCTION EXAMPLE 8

A 2-liter separable flask equipped with a reflux condenser was charged with 1,000 g of polybutadiene (Nisseki Polybutadiene B-700; number average molecular weight 700, 1,2-bond 52%, iodine number 440), 163 g of maleic anhydride, 1 g of Antigen 3C (trade name for a product of Sumitomo Chemical Co., Ltd.) and 10 g of xylene, and they were reacted at 195° C. for 5 hours. The unreacted maleic anhydride and xylene were distilled off under reduced pressure to produce maleinized polybutadiene (M$_2$) having an acid number of 143 millimoles/100 g.

Maleinized polyubutadiene (M$_2$; 500 g) and 70.8 g of ethyl Cellosolve were reacted at 120° C. for 2 hours to ring-open the succinic anhydride group and to produce a half ester (C$_2$) of maleinized polybutadiene.

PRODUCTION EXAMPLE 9

One thousand grams of the epoxidized polybutadiene (E$_2$) obtained in Example 2, 377 g of ethyl Cellosolve and 131.0 g of methylethanolamine were charged into a 3-liter separable flask, and reacted at 170° C. for 6 hours. After the reaction, the reaction mixture was cooled to 120° C. Then, a mixture of 140.0 g of synthetic drying oil fatty acid (Hidiene, a trade name, a product of Soken Chemical Co., Ltd.), 8.8 g of hydroquinone and 1.1 g of butyl Cellosolve was added. The mixture was reacted at 150° C. for 2 hours, and then cooled to 120° C. Acrylic acid (43.2 g) was added, and reacted at 120° C. for 4 hours to produce a resin solution (A$_4$) of the component (A) of the invention.

The resin had an amine number of 99.0 mmoles/100 g and an acid number of 9.9 millimoles/100 g, and the solution had a solids concentration of 75% by weight.

PRODUCTION EXAMPLE 10

One thousand grams of a bisphenol-type epoxy resin (trade name EPIKOTE 1004, a product of Yuka Shell Epoxy Co., Ltd.) having an epoxy equivalent of 950 which was obtained by reacting bisphenol A and epichlorohydrin in the presence of an alkaline catalyst and had the following structure

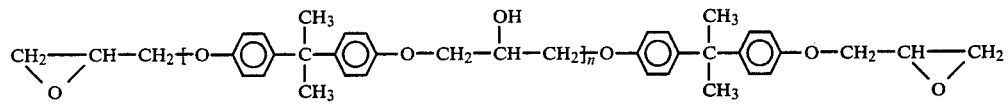

was dissolved in 247.4 g of ethyl Cellosolve, and 77.5 g of acrylic acid, 10 g of hydroquinone and 5 g of N,N-dimethylaminoethanol were added. The mixture was heated to 105° C., and reacted for 5 hours to produce a resin solution (B$_4$) of the component (B) of this invention.

PRODUCTION EXAMPLE 11

One thousand grams of a bisphenol-type epoxy resin (trade name EPIKOTE 1004, a product of Yuka Shell Epoxy Co., Ltd.) having an epoxy equivalent of 950 which was obtained by reacting bisphenol A and epichlorohydrin in the presence of an alkaline catalyst and had the following structure

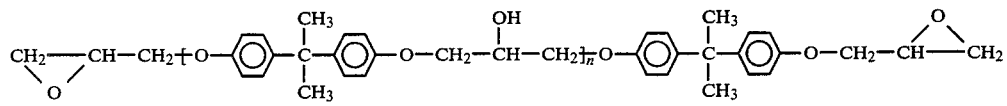

was dissolved in 383 g of ethyl Cellosolve, 148.4 g of dehydrated castor oil fatty acid, 38.2 g of acrylic acid, 12 g of hydroquinone and 6 g of N,N-dimethylaminoethanol were added. The mixture was heated to 100° C. and maintained for 6 hours at this temperature to produce a resin solution (B$_5$) of the component (B) of this invention.

EXAMPLE 1

Four hundred grams of the solution (A$_1$) produced in Production Example 1, 240 g of the solution (B$_1$) produced in Production Example 4 and 19.2 g of the solution (C$_1$) produced in Production Example 7 were mixed until a uniform mixture formed. Acetic acid (8.1 g) was added, and the mixture was fully stirred to neutralize the resin. Deionized water was gradually added to prepare an aqueous solution having a solids concentration of 20% by weight.

Two thousand grams of the 20% by weight aqueous solution, 4 g of carbon black, 20 g of basic lead silicate and 2,000 g of glass beads were put in a 5 liter stainless steel beaker, and vigorously stirred for 2 hours by a high-speed rotating mixer. The glass beads were separated by filtration. Then, deionized water containing 0.32 g as manganese metal of manganese acetate was added to prepare an electrodeposition coating solution having a solids concentration of 16.5% by weight.

The electrodeposition coating solution was electrodeposited on a zinc phosphate treated plate (Bt 3004, $0.8 \times 7.0 \times 150$ mm; a product of Nippon Test Panel Co., Ltd.) as the cathode using a carbon electrode as the anode. The results of various tests are shown in Table 1.

EXAMPLE 2

A cathode depositing electrodeposition coating solution was prepared under the same conditions as in Example 1 except that instead of manganese acetate, cobalt acetate was used in the same amount of cobalt as the manganese. Tests under the same conditions as in Example 1 were performed, and the results are summarized in Table 1.

EXAMPLE 3

A cathode depositing electrodeposition coating solution was prepared under the same conditions as in Example 1 except that instead of manganese acetate, copper acetate was used in the same amount of copper as the manganese. Tests under the same conditions as in Example 1 were performed, and the results are summarized in Table 1.

COMPARATIVE EXAMPLE 1

A cathode-depositing electrodeposition coating solution was prepared under the same conditions as in Example 1 except that the solution ($C_1$) was not added. Tests under the same conditions as in Example 1 were performed, and the results are summarized in Table 1.

TABLE 1

|  | Example 1 | Example 2 | Example 3 | Comparative Example 1 |
|---|---|---|---|---|
| Baking temperature (°C., baking time 20 minutes) | 165 | 165 | 165 | 165 |
| Thickness of the coated film (microns) | 20 | 20 | 20 | 20 |
| Pencil hardness | 2H | 2H | H | HB |
| Solvent resistance (*1) |  |  |  | Δ |
| Corrosion resistance 500 hours (*2) | ⊚ | ⊚ | ⊚ | Δ |
| Crosslinking density (× | 13.5 | 12.0 | 9.0 | 5.7 |

TABLE 1-continued

|  | Example 1 | Example 2 | Example 3 | Comparative Example 1 |
|---|---|---|---|---|
| $10^{-4}$ moles/cc) (*3) |  |  |  |  |

(*1) A rubbing test (50 cycles per minute) using methyl isobutyl ketone was carried out, and the result was evaluated on the following standard.
○ : Not changed.
Δ: The rubbed portion became hazy.
X: The substrate was exposed.
(*2) The maximum rust width from a cut portion formed on the coated film was determined, and evaluated on the following standard (5% NaCl aqueous solution spray test)
⊚: less than 1 mm
○ : 1-2 mm
Δ: 2-3 mm
X: more than 3 mm
(*3) Measured by an automatic viscoelasticity tester (RHEOVIBRON DDV-II-EA made by Toyo-Baldwin Co., Ltd.) under the following measuring conditions.
Temperature elevating rate: 3° C./min.
Frequency: 11 Hz.

EXAMPLE 4

Four hundred grams of the solution ($A_2$) produced in Production Example 2, 400 g of the solution ($B_2$) produced in Production Example 5 and 24 g of the solution ($C_2$) produced in Production Example 8 were mixed until a uniform mixture formed. Acetic acid (9.6 g) was added, and the mixture was fully stirred to neutralize the resin. Deionized water was gradually added to prepare an aqueous solution having a solids concentration of 25% by weight.

One thousand grams of the 25% by weight aqueous solution, 2.5 g of carbon black, 25 g of basic lead silicate and 1,000 g of glass beads were put in a 3-liter stainless steel beaker, and vigorously stirred for 2 hours by a high-speed rotating mixer. The glass beads were separated by filtration. Then, deionized water containing 0.13 g as manganese metal of manganese acetate was added to prepare an electrodeposition coating solution having a solids concentration of 18% by weight.

The electrodeposition coating solution was electrodeposited on a zinc phosphate treated plate (Bt 3004, $0.8 \times 7.0 \times 150$ mm; a product of Nippon Test Panel Co., Ltd.) as the cathode using a carbon electrode as the anode. The results of various tests are shown in Table 2.

COMPARATIVE EXAMPLE 2

A cathode-depositing electrodeosition coating solution was prapred under the same conditions except that the solution ($C_2$) was not added. Tests under the same conditons as in Example 4 were performed, and the results are shown in Table 2.

TABLE 2

|  | Example 4 | Comparative Example 2 |
|---|---|---|
| Baking temperature (°C.) (baking time 20 minutes) | 160 | 160 |
| Thickness of the coated film (microns) | 20 | 20 |
| Pencil hardness | H | F |
| Solvent resistance (*1) |  | Δ |
| Corrosion resistance 500 hours (*2) |  | Δ |

(*1) and (*2): Same as the footnote to Table 1.

EXAMPLE 4

Four hundred grams of the solution ($A_3$) produced in Production Example 3, 120 g of the solution ($B_3$) produced in Production Example 6 and 10.4 g of the solution (C₁) produced in Production Example 7 were mixed until a uniform mixture formed. Acetic acid (9.0 g) was added, and the mixture was fully stirred to neutralize the resin. Deionized water was gradually added to prepare an aqueous solution having a solids concentration of 30% by weight.

One thousand grams of the 30% by weight aqueous solution, 3 g of carbon black, 20 g of basic lead silicate and 1,000 g of glass beads were put in a 3-liter stainless steel beaker, and vigorously stirred for 2 hours by a high-speed rotating mixer. The glass beads were separated by filtration. Then, deionized water containing 0.15 g as manganese metal of manganese acetate was added to prepare an electrodeposition coating solution having a solids concentration of 16% by weight.

The electrodeposition coating solution was electrodeposited on a zinc phosphate treated plate (Bt 3004, 0.8×7.0×150 mm; a product of Nippon Test Panel Co., Ltd.) as the cathode using a carbon electrode as the anode. The results of various tests are shown in Table 3.

COMPARATIVE EXAMPLE 3

A cathode-depositing electrodeposition coating solution was prepared under the same conditions as in Example 5 except that the solution (C₁) was not added. Tests under the same conditions as in Example 5 were performed, and the results are shown in Table 3.

TABLE 3

| | Example 5 | Comparative Example 3 |
|---|---|---|
| Baking temperature (°C.) (baking time 20 minutes) | 155 | 155 |
| Thickness of the coated film (microns) | 20 | 20 |
| Pencil hardness | H | HB |
| Solvent resistance (*1) | ○ | △ |
| Corrosion resistance 500 hours (*2) | ○ | △ |
| Crosslinking density (× 10⁻⁴ mole/cc) (*3) | 10.2 | 6.3 |

(*1), (*2) and (*3) are the same as the footnote to Table 1.

EXAMPLE 6

Four hundred grams of the solution (A₁) produced in Production Example 1 and 240 g of the solution (B₅) produced in Production Example 11 were mixed until a uniform mixtrure formed. Then, as component (C), 7.2 g of dehydrated castor oil fatty acid and 8.6 g of acetic acid were successively added. The mixture was fully stirred and neutralized. Then, deionized water was gradually added to prepare an aqueous solution having a solids concentration of 20% by weight.

Two thousand grams of the 20% aqueous solution, 4 g of carbon black, 20 g of basic lead silicate and 2,000 g of glass beads were put in a 5-liter stainless steel beaker, and vigorously stirred for 2 hours by a high-speed rotating mixer. The glass beads were separated by filtration. Deionized water containing 0.32 g as manganese metal of manganese acetate was added to prepare an electrodeposition coating solution having a solids concentration of 16.5% weight.

The electrodeposition coating solution was electrodeposited on a zinc phosphate treated plate (Bt 3004, 0.8×7.0×150 mm; a product of Nippon Test Panel Co., Ltd.) as the cathode using a carbon electrode as the anode. The results of various tests are shown in Table 4.

EXAMPLE 7

A cathode-depositing electrodeposition coating solution was prepared under the same conditions as in Example 6 except that instead of manganese acetate, cobalt acetate was used in the same amount of cobalt as manganese. Tests under the same conditions as in Example 6 were performed, and the results are shown in Table 4.

EXAMPLE 8

A cathode-depositing electrodeposition coating solution was prepared under the same conditions as in Example 6 except that 9.6 g of tung oil fatty acid was used instead of the dehydrated castor oil fatty acid as component (C). Tests under the same conditions as in Example 6 were performed, and the results are shown in Table 4.

COMPARATIVE EXAMPLE 4

A cathode-depositing electrodeposition coating solution was prepared under the same conditions as in Example 6 except that the component (C) was not added. Tests under the same conditions as in Example 6 were performed, and the results are shown in Table 4.

TABLE 4

| | Example 6 | Example 7 | Example 8 | Comparative Example 4 |
|---|---|---|---|---|
| Baking temperature (°C., baking time 20 minutes) | 155 | 155 | 155 | 155 |
| Thickness of the coated film (microns) | 20 | 20 | 20 | 20 |
| Pencil hardness | 2H | 2H | H | HB |
| Solvent resistance (*1) | | | | △ |
| Corrosion resistance 500 hours (*2) | | | | △ |
| Crosslinking density (× 10⁻⁴ moles/cc) (*3) | 13.5 | 12.0 | 9.0 | 5.7 |

(*1), (*2) and (*3) are the same as the footnote to Table 1.

EXAMPLE 9

Four hundred grams of the solution (A₄) produced in Production Example 9, 400 g of the solution (B₄) produced in Production Example 11 and as component (c), 12 g of synthetic drying oil fatty acid (Hidiene, a trade name, a product of Soken Chemical Co., Ltd.) were mixed until a uniform mixture formed. Then, 9.6 g of acetic acid was added. The mixture was fully stirred and neutralized. Deionized water was gradually added to prepare an aqueous solution having a solids concentration of 25% by weight.

One thousand grams of the 25% aqueous solution, 2.5 g of carbon black, 25 g of basic lead silicate and 1,000 g of glass beads were put in a 3-liter stainless steel beaker, and vigorously stirred for 2 hours by a high-speed rotating mixer. The glass beads were separated by filtration. Deionized water containing 0.13 g as manganese metal of manganese acetate was added to prepare an electrodeposition coating solution having a solids concentration of 18% weight.

The electrodeposition coating solution was electrodeposited on a zinc phosphate treated plate (Bt 3004, 0.8×7.0×150 mm; a product of Nippon Test Panel Co., Ltd.) as the cathode using a carbon electrode as the anode. The results of various tests are shown in Table 5.

COMPARATIVE EXAMPLE 5

A cathode-depositing electrodepositiong coating solution was prepared under the same conditions as in Example 9 except that the synthetic drying oil fatty acid (Hidiene, trade name, a product of Soken Chemical Co., Ltd.) as component (C) was not added. Tests under the same condtiions as in Example 9 were performed, and the results are shown in Table 5.

TABLE 5

|  | Example 9 | Comparative Example 5 |
|---|---|---|
| Baking temperature (°C.) (baking time 20 minutes) | 150 | 150 |
| Thickness of the coated film (microns) | 20 | 20 |
| Pencil hardness | H | F |
| Solvent resistance (*1) |  | Δ |
| Corrosion resistance 500 hours (*2) |  | Δ |

(*1) and (*2): Same as the footnote to Table 1.

What is claimed is:

1. A cathode-depositing electrodeposition coating composition having excellent low-temperature curability comprising as essential ingredients
    (A) 100 parts by weight of a reaction product of (1) a high molecular compound having a molecular weight of 500 to 5,000 based upon the number average molecular weight and containing carbon-carbon double bonds with an iodine number of 50 to 500 and 3 to 12% by weight of oxirane oxygen, (2) 30 to 300 millimoles, per 100 g of the high molecular compound (1), of an amine compound represented by the general formula

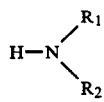

wherein each of $R_1$ and $R_2$ represents a hydrocarbon group having 1 to 20 carbon atoms a part of which may be substituted by a hydroxyl group, and $R_1$ and $R_2$ may assume a ring structure which may contain an unsaturated group,
and (3) 50 to 150 millimoles, per 100 g of the high molecular compound (1), of an alpha,beta-unsaturated carboxylic acid represented by the general formula

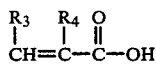

wherein $R_3$ and $R_4$ represent a hydrogen atom or a methyl group,
or an unsaturated fatty acid having a molecular weight of 100 to 350 based upon the number average molecular weight and containing at least 10% by weight of a carbon-carbon conjugated double bond or a mixture of both,
    (B) 10 to 200 parts by weight of a reaction product of a diglycidyl compound represented by the general formula

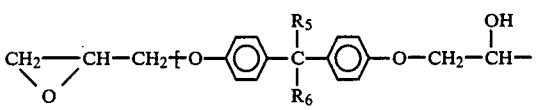

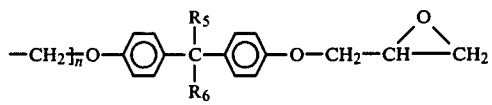

wherein $R_5$ and $R_6$ represent a hydrogen atom or a methyl group, and n represents an integer of 0 to 20,
with 1.9 to 2.1 moles, per molecule of the diglycidyl compound, of an alpha,beta-unsaturated carboxylic acid represented by the general formula

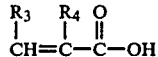

wherein $R_3$ and $R_4$ represent a hydrogen atom or a methyl group,
or an unsaturated fatty acid having a molecular weight of 100 to 350 based upon the number average molecular weight and containing at least 10% by weight of a carbon-carbon double bond, or a mixture of both,
    (C) 0.5 to 10 parts by weight of a reaction product of 100 g of a high molecular compound having a molecular weight of 500 to 5,000 based upon the number average molecular weight and containing a carbon-carbon double bond with an iodine number of 50 to 500 and 40 to 400 millimoles of an alpha,beta-unsaturated dicarboxylic acid anhydride represented by the general formula

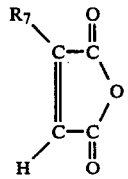

wherein $R_7$ represents a hydrogen or halogen atom or a methyl group,
or a derivative of the reaction product such as its partial ester or partial amide, or 0.1 to 10 parts by weight of an unsaturated monocarboxylic acid having 6 to 24 carbon atoms or its dimer, and
    (D) 0.005 to 1.0 part by weight, as metal, of a water-soluble salt of an organic acid with a metal selected from manganese, cobalt, and copper.

2. The composition of claim 1 wherein the alpha,beta-unsaturated carboxylic acid (3) used the production of component (A) is acrylic acid, methacrylic acid or crotonic acid.

3. The composition of claim 1 wherein the unsaturated fatty acid (3) used for the production of component (A) is dehydrated castor oil fatty acid or synthetic drying oil fatty acid.

4. The composition of claim 1 wherein the component (B) results from the conversion of substantially all of the epoxy groups of the diglycidyl compound into the groups

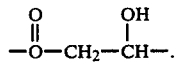

5. The composition of claim 1 wherein the reaction product of the high molecular compound having a carbon-carbon double bond and the alpha,beta-unsaturated dicarboxylic acid as component (c) is maleinized polybutadiene or maleinized linseed oil.

* * * * *